United States Patent [19]

Hart et al.

[11] Patent Number: 4,883,176

[45] Date of Patent: Nov. 28, 1989

[54] PAPERBOARD VIDEO CASSETTE HOUSING

[75] Inventors: Joseph J. Hart, Philadelphia; Christine S. Springman, Downington, both of Pa.

[73] Assignee: Container Corporation of America, Clayton, Mo.

[21] Appl. No.: 351,587

[22] Filed: May 15, 1989

[51] Int. Cl.⁴ ..................... G11B 23/087; G11B 23/04
[52] U.S. Cl. .................................. 206/387; 206/389; 242/199
[58] Field of Search ................ 242/199; 206/387, 389, 206/395, 396

[56] References Cited

U.S. PATENT DOCUMENTS

| | | | |
|---|---|---|---|
| 4,122,945 | 10/1978 | Borzak | 206/395 |
| 4,352,578 | 10/1982 | Dunning et al. | 229/16 R |

Primary Examiner—Stephen Marcus
Assistant Examiner—Jacob Ackun, Jr.
Attorney, Agent, or Firm—Richard W. Carpenter

[57] ABSTRACT

A housing for enclosing the inner operating mechanism of a limited use, composite, video cassete. The housing is formed from a one-piece blank of foldable paperboard and has opposed top and bottom side walls interconnected by a front wall and a pair of end walls, that form a box-like enclosure, and has spring tabs formed from material of one of the side walls for engagement with portions of the inner operating mechanism.

9 Claims, 1 Drawing Sheet

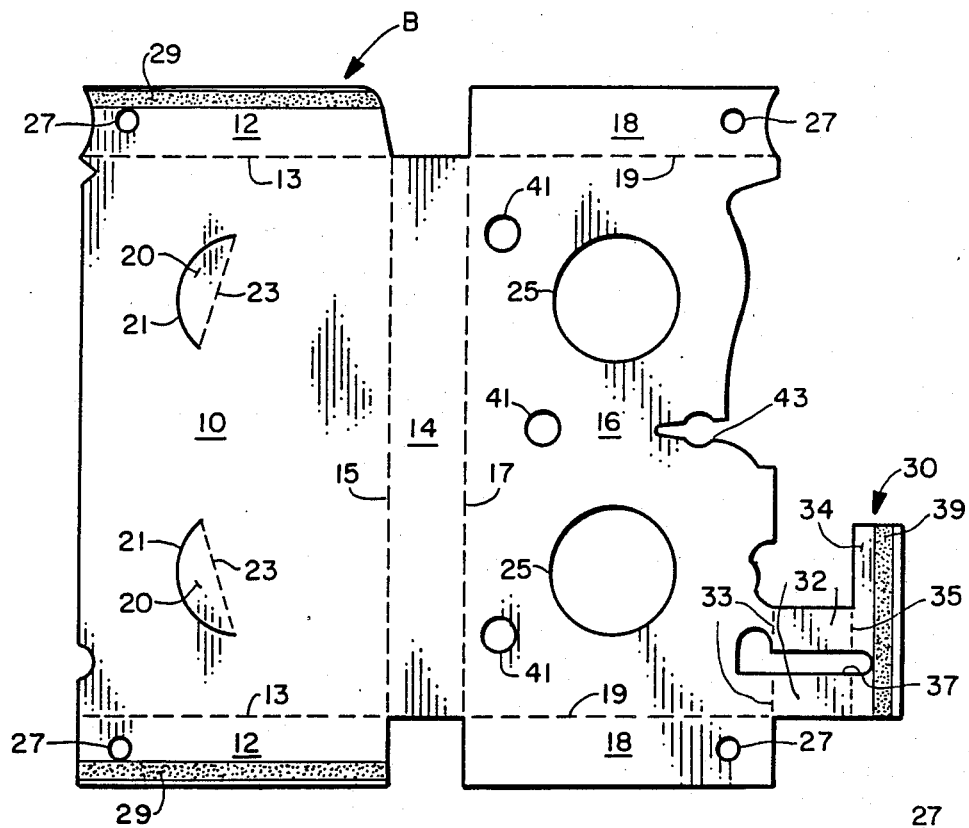
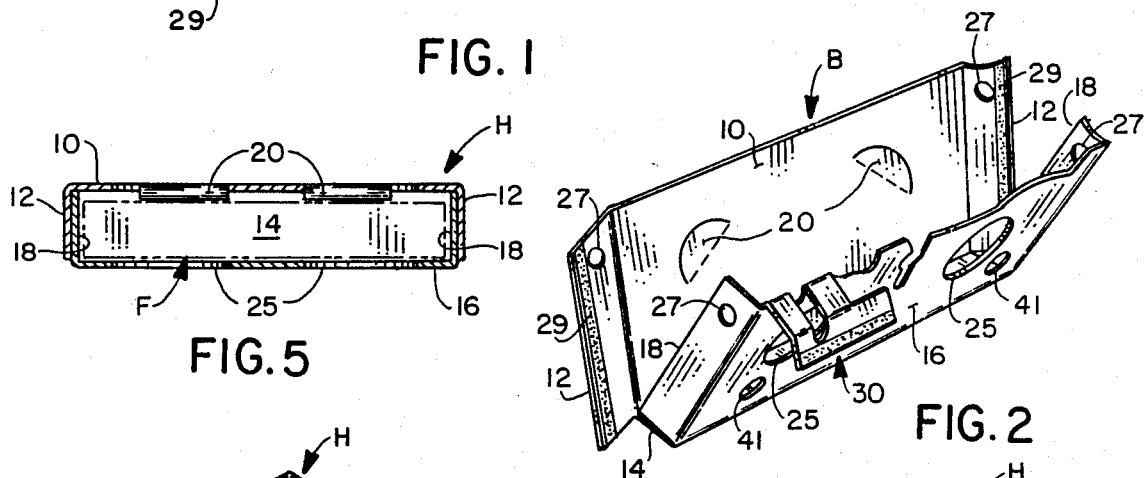
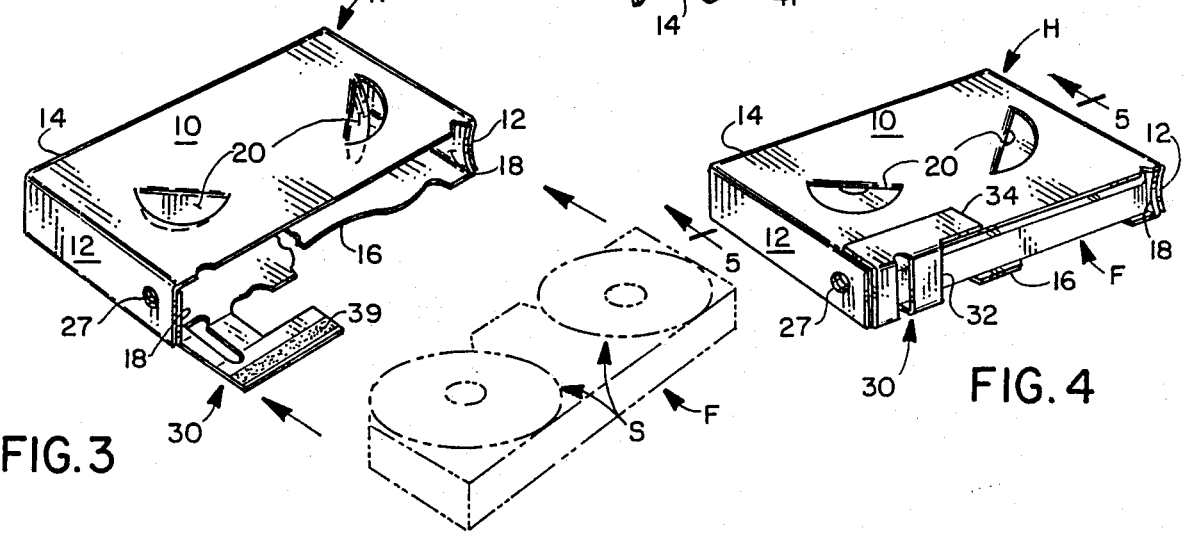

PAPERBOARD VIDEO CASSETTE HOUSING

BACKGROUND OF THE INVENTION

1. Field of the Invention

This invention relates to inexpensive video cassettes suitable for limited use, such as for an advertising promotion, and more particularly to a paperboard housing for enclosing the conventional inner operating mechanism of a video cassette.

2. Description of Background Art

A background art search directed to the subject matter of this application conducted in the United States Patent and Trademark Office disclosed the following U.S. Pat. Nos.: 2,631,034; 4,445,634; 4,527,691; 4,688,673; 4,788,614.

None of the patents uncovered in the search discloses a composite video cassette having a conventional inner operating mechanism that is formed primarily of plastic materials and is disposed within an outer housing formed from a blank of foldable paperboard and which comprises opposed top and bottom side walls interconnected by a front wall and a pair of end walls that combine to form a box-like enclosure which is open at the rear.

SUMMARY OF THE INVENTION

It is an object of the invention to provide a limited use video cassette having a conventional inner operating mechanism disposed within an outer housing formed from foldable paperboard.

A more specific object of the invention is the provision, in a composite video cassette, of a paperboard housing for enclosing the conventional inner operating mechanism, which housing includes a pair of top and bottom side walls interconnected by a front wall and a pair of end walls which form, with the top and bottom side walls, a box-like enclosure open at the rear.

These and other objects of the invention will be apparent from an examination of the following description and drawings.

BRIEF DESCRIPTION OF THE DRAWINGS

FIG. 1 is a plan view of the outer surface of a blank of sheet material from which the video cassette housing illustrated in the other views may be formed;

FIG. 2 is a fragmentary view of the structure illustrated in FIG. 1, shown in the partially erected condition;

FIG. 3 is an exploded, fragmentary, perspective view illustrating the partially erected housing and the inner mechanism before the latter is inserted into the former;

FIG. 4 is a perspective view of a composite video cassette having the paperboard housing embodying features of the invention, and illustrated in the previous views; and FIG. 5 is a fragmentary, transverse, sectional view taken on line 5—5 of FIG. 4.

It will be understood that, for purposes of clarity, certain elements may have been intentionally omitted from certain views where they are believed to be illustrated to better advantage in other views.

DESCRIPTION OF THE PREFERRED EMBODIMENT

Referring now to the drawings for a better understanding of the invention, and particularly to FIGS. 1, 3 and 4, it will be seen that the composite video cassette illustrated in FIGS. 3 and 4 includes an outer structure or housing H, formed from a unitary blank B of foldable paperboard illustrated in FIG. 1.

The housing is adapted to enclose a conventional inner working mechanism, formed primarily of plastic, which includes a frame structure F adapted to support a pair of reels or spools S. As the inner working mechanism of the cassette is conventional in nature, the details of the frame structure, the reels, and the driving and braking mechanisms for the reels are not illustrated in the application.

Referring now to FIG. 1 of the drawings, it will be seen that the housing H includes a pair of top and bottom side wall panels 10 and 16, respectively, which are interconnected by a front wall panel 14 and a pair of end walls. The front wall panel 14 is foldably joined to corresponding rear side edges of the top and bottom side wall panels 10 and 16 along parallel fold lines 15 and 17, respectively.

Bottom side wall panel 16 is provided with a pair of preferably round openings 25 which are spaced from each other and which afford access to the interior mechanism of the cassette.

Top side wall panel 10 is provided with a pair of preferably semi-circular spring tabs 20 formed from material of the top side wall panel and defined by an arcuate cut line 21 and a straight fold line 23. When the tabs are folded inwardly, as shown in FIGS. 3-5, they serve to bias the inner mechanism toward top side wall panel 16.

The end walls each include a pair of inner panels 12, foldably joined to opposite end edges of the top side wall panel 10 along fold lines 13, and a pair of outer panels 18, foldably joined to opposite ends of bottom side wall panel 16 along fold lines 19. The inner and outer end wall panels are folded into overlapped relation and secured to each other by strips of adhesive indicated generally at 29. The end wall panels may be provided with a plurality of openings 27 to afford access to the interior mechanism of the cassette when the cassette has been completely assembled.

After the inner mechanism has been inserted into the housing, it may be retained in place by a retaining member indicated generally at 30, which is attached to the side wall panels of the housing and extends across the open rear side of the housing, as seen in FIG. 2.

Again referring to FIG. 1, it will be seen that retaining member 30 includes a pair of parallel strips 32, foldably joined at corresponding ends along fold lines 33 to the rear side edge of bottom side wall panel 16, and which define an opening 37 therebetween.

The opposite corresponding ends of the strips 32 are joined to each other by a transversely extending third strip 34 which is foldably joined to the ends of strips 32 along fold lines 35.

After the inner mechanism has been inserted into the housing, the retaining member may be folded on fold lines 33 and 35, and the third strip 34 can be secured to an adjacent surface of the top side wall member 10 by an adhesive indicated generally at 39.

Thus, it will be appreciated that the invention provides an inexpensive limited use video cassette having a paperboard housing for a conventional inner operating mechanism.

What is claimed is:

1. In a composite, limited use, video cassette, a conventional operating mechanism, formed primary of molded plastic material and including a frame carrying a pair of tape reels and control elements engagable with related elements of a video cassette recording device for driving and braking said reels, and a housing enclosing said operating mechanism, said housing being formed from a unitary blank of foldable sheet material such as paperboard and comprising:
- (a) a pair of first and second side wall walls spaced from each other and interconnected by a front wall and a pair of end walls foldably joied to corresponding front side edges and end edges, respectively, of said side walls to form a box-like structure open at the rear;
- (b) a retaining member extending between said side walls across the rear of said housing to retain said operating mechanism in said housing;
- (c) one of said side walls having a pair of openings affording access to said tape reels;
- (d) the other of said side wall having a pair of spring tabs cut from from material thereof and folded inwardly therefrom between said other side wall and said tape reels to bias the latter toward said one side wall.

2. A housing for enclosing, in a composite limited use video cassette, a conventional inner operating mechanism, formed primary of molded plastic material and including a frame carrying a pair of tape reels frame and control elements engagable with related elements of a video cassette recording device for driving and braking said reels, said housing being formed from a unitary blank of foldable sheet material such as paperboard and comprising:
- (a) a pair of first and second side wall walls spaced from each other and interconnected by a front wall and a pair of end walls foldably joined to corresponding front side edges and end edges, respectively, of said side walls to form a box-like structure open at the rear;
- (b) a retaining member extending between said side walls across the rear of said housing and adapted to retain an operating mechanism in said housing;
- (c) one of said side walls having a pair of openings affording access to tape reels of an operating mechanism;
- (d) the other of said side walls having a pair of spring tabs cut from from material thereof and folded inwardly therefrom and adapted to bias tape reels of an operating mechanism positioned in said housing toward said one side wall.

3. A unitary blank of foldable sheet material such as paperboard, for use in forming a housing for enclosing, in a composite limited use video cassette, a conventional inner operating mechanism, formed primary of molded plastic material and including a frame carrying a pair of tape reels and control elements engagable with related elements of a video cassette recording device for driving and braking said reels, said blank being cut and scored to provide:
- (a) a front wall panel having parallel opposed side edges;
- (b) a pair of first and second side wall panels having first side edges foldably joined to respective side edges of said front wall panel and having second side edges and opposed end edges;
- (c) end wall panels foldably joined to respective end edges of said side wall panels;
- (d) a retaining member extending from a second side edge of one of said side wall panels;
- (e) one of said side wall panels having a pair of longitudinally spaced openings extending therethrough;
- (f) the other of said side wall panels having, spaced longitudinally spaced from each other, a pair of spring tabs cut from material of said other side wall panel and joined thereto on fold lines.

4. A cassette according to claim 1, wherein said retaining member includes a pair of strips spaced from each other and defining an opening therebetween.

5. A housing according to claim 2, wherein said retaining member includes a pair of strips spaced from each other and defining an opening therebetween.

6. A blank according to claim 3, wherein said retaining member includes a pair of strips with corresponding ends foldably joined to one side wall panel, said strips being spaced from each other to define an opening therebetween and having other corresponding ends interconnected by a third strip.

7. A cassette according to claim 1, wherein said spring tabs are aligned with the respective openings affording access to said reels.

8. A housing according to claim 2, wherein said spring tabs are aligned with the respective openings affording access to said reels.

9. A blank according to claim 3, wherein said spring tabs are disposed in alignment with respective longidudinally spaced openings.

* * * * *